Patented Nov. 25, 1924.

1,517,200

UNITED STATES PATENT OFFICE.

FRANK WORDSWORTH DONISTHORPE, OF MAIDA VALE, LONDON, ENGLAND, ASSIGNOR TO DYE IMPRESSION PHOTOS, LIMITED, OF KENSINGTON, LONDON, ENGLAND, AN ENGLISH CORPORATION.

PROCESS OF DYE TRANSFER PRINTING FROM PHOTOGRAPHIC NEGATIVES.

No Drawing.  Application filed August 18, 1920.  Serial No. 404,414.

*To all whom it may concern:*

Be it known that I, FRANK WORDSWORTH DONISTHORPE, a subject of His Majesty the King of England, and resident of Maida Vale, in the county of London, Kingdom of England, have invented certain new and useful Improvements in and Relating to Processes of Dye Transfer Printing from Photographic Negatives, of which the following is a specification.

My invention has for its object to provide an improved process for obtaining prints direct from photographic negatives by surface contact and independent of the aid of light, thus permitting the utilization of a non-transparent base for the manufacture of photographic plates and films, and of a printing medium which is in no way sensitive to light and may be dried with great rapidity, and obviating the use and expense of glass, celluloid and sensitized photographic or other specially prepared printing paper for these purposes.

I believe the only other attempt at this object was carried out by me according to my United States Patent No. 923,030 wherein I mentioned the properties of certain chemicals, (vanadium chloride in particular) for rendering the silver image of a photographic plate or film impermeable to certain dyes. However, I have found that a defect of the process carried out under my afore-mentioned patent was that the dye would frequently refuse to penetrate the negative, or would penetrate very unevenly in patches and streaks. My present invention obviates these difficulties, and, by its means, perfectly uniform results are obtained with constant regularity, even on commercial printing paper not especially prepared for the purpose.

As in my before-mentioned prior patent, the developed photographic plate or film, hereinafter termed the negative, is first immersed in a bath, hereinafter called the preparing bath, possessing the above mentioned properties of rendering the silver image of the negative impermeable to certain dyes, and then in a dye bath, the wet dye absorbed by the negative being then transferred by contact to a suitable wet printing medium; such reproductions of the dyed image being hereinafter termed prints. My present invention is based, primarily, upon my discovery that the penetration of the dye into the negative can be perfectly controlled by varying the proportion or quantity of acid contained in the preparing bath, and upon my discovery that the degree of impermeability to dyes imparted by the said preparing bath to the silver image of a negative is far greater than the degree of impermeability produced by the action of light on the bichromated gelatine used in the pinatype process, the outcome of such discoveries being that not only can far more rapidly penetrating dyes now be used, but also extremely cheap printing papers, which latter can be dried with great rapidity by heat.

It is obvious that a coating of bichromated gelatine hardened by means of light cannot be employed on a printing paper for the pinatype process, since the dyes utilized and known as the pinatype dyes are such that they produce a correct dye image by refusing to penetrate the light hardened bichromated gelatine of the negative, and, therefore, would refuse to penetrate the surface of a similarly hardened gelatine coated paper.

The degree of impermeability to dyes obtained in a negative by the preparing bath being, as stated above, far greater than that obtainable by light hardened bichromated gelatine, the slowly penetrating pinatype dyes hitherto employed may be replaced by other dyes, for example patent blue, which rapidly penetrate and even possess an affinity for gelatine hardened to such a degree as to be insoluble in hot water even at relatively high temperatures, such dyes refusing, nevertheless, to penetrate the silver image of a negative prepared in accordance with the invention.

It will now be understood that since the afore-mentioned rapid dyes may be utilized under my present invention, the printing medium may be coated with gelatine hardened and rendered insoluble by any known process such as the aforementioned bichromate and exposure to light, or by means of alum, formaline and the like, the degree of hardening being such that prints obtained on such papers can be dried with great rapidity in the immediate vicinity of a fire or the flame of a spirit lamp or the like, the advantage of such rapid drying being not only the increased speed of the process but also the elimination of all loss of sharpness of the dye image due to the spreading of the dye while the print remains damp.

It will be understood, furthermore, that since the printing paper utilized under my present invention may advantageously possess a surface of hardened gelatine, easily obtainable and cheap papers may be employed, for example, the papers known as baryta coated papers, art paper, and the like.

A satisfactory formula for the aforementioned preparing bath includes vanadium chloride, but it should be understood that the scope of my invention is not limited to the use of this metallic salt, and that the same is only mentioned by way of example.

If a negative is immersed first in a preparing bath including a relatively small proportion or quantity of oxalic or other suitable acid and then in a dye bath for the necessary periods, it will be found that the dye will either refuse to penetrate the said negative or will penetrate only in patches and streaks. If the proportion or quantity of acid is increased the dye will penetrate more readily and with greater uniformity. When sufficient acid has been added, the penetration of the dye will be quite uniform and regular, also requisitely inversely proportionate to the quantities of silver in the various parts of the surface of the negative. If the proportion of acid in the preparing bath be still further increased, the dye will again begin to penetrate the silver in the negative until, finally, the darkest parts are penetrated.

It will now be clearly understood that by correctly adjusting the constituents of the preparing bath, particularly in respect to the proportion of the acid, the penetration of the negative by the dye can be regulated as required, namely, in such a manner that the dye image transferred to the wet printing medium will be the exact inverse of the silver image on the unprepared negative. As opposed to this feature of my present invention, heretofore the acids have only been included in solutions, possessing the properties of the above-mentioned preparing bath, in such quantities as are requisite to maintain the formulæ of said solutions, and in no way with a view to, or in the proportions requisite for, the correct control of the penetration of the dye into the negative.

Furthermore, I have discovered that the transfer of dyes from a dyed negative to a print can be advantageously controlled, regulated and accelerated either by the addition of citric or other suitable acid to the dye bath, or by soaking the printing medium in a bath of dilute citric, sulphuric or other suitable acid prior to the placing of said medium in contact with the negative, and that such an addition of acid to the dye bath is, in certain cases, also beneficial in so far as the control of the penetration of the dye into the prepared negative is concerned.

The possibility of utilizing extremely cheap commercial papers, such as the above mentioned, together with the rapidity with which successive prints may be obtained from the same negative and dried, renders my hereinbefore described improved process extremely advantageous for the purpose of the commercial reproduction of photographs, plans or drawings, particularly when the dimensions of the required prints are relatively great. Many of such papers, for example the baryta coated and art papers, do not, however, possess, when dry, surfaces which are transparent as in the gelatine coated papers. Such being the case, the efficient use of such commercial papers has only been rendered possible owing to my further discovery that the consequent veiled appearance of a dye image on such papers, most detrimental when depth of colour and half tones are required, can be obviated by rubbing or coating the surface of the dry print over with a clear transparent oil, varnish or other preparation capable of rendering the surface of said print transparent and the dye which has penetrated beneath said surface visible. Prints when so prepared possess, furthermore, the advantage that they are partially waterproof.

What I claim is:—

1. A process of dye transfer printing from photographic negatives, which consists in immersing the negative in a preparing bath containing acid and then in a dye bath, controlling the penetration of the dye or dyes into the prepared negative by varying the proportion or quantity of said acid contained in said preparing bath, and transferring the dye or dyes from the negative to a printing medium by direct surface contact.

2. A process of dye transfer printing from photographic negatives, which consists in immersing the negative in a preparing bath having an acid content for controlling the penetration of the dye, and then in a bath containing a dye, such as patent blue, characterized by its power to readily penetrate gelatine which is hardened and insoluble in hot water, and transferring the dye or dyes from the negative to a printing medium by direct surface contact.

3. A process of dye transfer printing from photographic negatives, which consists in immersing the negative in a preparing bath having an acid content or controlling the penetration of the dye, and then in a dye bath, transferring the dye or dyes from the negative to a printing medium by direct surface contact, and controlling and accelerating such transference by the addition of acid to said dye bath.

4. A process of dye transfer printing from photographic negatives, which consists in immersing the negative in an acid preparing bath, and then in a dye bath, the acid of the preparing bath controlling the penetration of the dye and transferring the dye or dyes from the negative by direct surface contact to commercial printing mediums such as baryta coated paper, art paper, and the like.

5. A process of dye transfer printing from photographic negatives, which consists in immersing the negative in an acid preparing bath, and then in a dye bath, the acid of the preparing bath controlling the penetration of the dye, transferring the dye or dyes from the negative to a printing medium by direct surface contact, and rubbing or coating the surface of said medium with a substance capable of rendering said surface transparent.

6. The process of obtaining dye prints by surface contact directly from dyed silver photographic negatives, consisting in preparing a photographic negative so that solutions of suitable dye will be absorbed by the prepared negative in inverse proportion to the reduced silver contained in the image, the preparing solution including metallic salts and a reducing agent with the addition of an acid, wherein the chemical combination and precipitation of the metallic salts and reducing agent is restrained for a definite but relatively short period by the addition of the acid, the acid being in such proportion as to obtain the optimum uniform chemical reaction of said salts and reducing agent with the reduced silver.

7. A process of dye transfer printing from photographic negatives, consisting in immersing the negative in a preparing bath, the penetration of the dye into the negative being controlled by the acid contained in the preparing bath, and transferring the dye or dyes from the negative to a printing medium by direct surface contact, the surface or coating of such printing medium having been hardened and rendered insoluble in hot water.

In testimony whereof I hereunto have signed my name.

FRANK WORDSWORTH DONISTHORPE.